(12) United States Patent
Kobayashi et al.

(10) Patent No.: US 9,231,259 B2
(45) Date of Patent: Jan. 5, 2016

(54) FUEL CELL STACK

(71) Applicant: HONDA MOTOR CO., LTD., Minato-Ku, Tokyo (JP)

(72) Inventors: Tsuyoshi Kobayashi, Utsunomiya (JP); Kimiharu Mizusaki, Utsunomiya (JP); Masaharu Suzuki, Utsunomiya (JP); Tadashi Nishiyama, Sakura (JP); Kenji Nagumo, Kita-Ku (JP); Kentaro Ishida, Utsunomiya (JP); Yuta Ikeda, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/496,341

(22) Filed: Sep. 25, 2014

(65) Prior Publication Data

US 2015/0093670 A1    Apr. 2, 2015

(30) Foreign Application Priority Data

Sep. 27, 2013  (JP) .................................. 2013-202749
Sep. 1, 2014   (JP) .................................. 2014-177139

(51) Int. Cl.
    H01M 8/04   (2006.01)
    H01M 8/02   (2006.01)
    H01M 8/10   (2006.01)

(52) U.S. Cl.
    CPC ........ *H01M 8/04067* (2013.01); *H01M 8/0267* (2013.01); *H01M 2008/1095* (2013.01)

(58) Field of Classification Search
    CPC ..................... H01M 8/0267; H01M 8/04067
    See application file for complete search history.

(56) References Cited

U.S. PATENT DOCUMENTS

| | | | |
|---|---|---|---|
| 6,180,273 B1 | 1/2001 | Okamoto | |
| 6,582,844 B2 | 6/2003 | Okamoto | |
| 2004/0131905 A1* | 7/2004 | Enjoji et al. | 429/26 |
| 2008/0187805 A1* | 8/2008 | Jinba et al. | 429/26 |
| 2010/0310958 A1* | 12/2010 | Naito et al. | 429/434 |
| 2011/0065013 A1* | 3/2011 | Nishimura et al. | 429/429 |
| 2013/0017470 A1 | 1/2013 | Hotta et al. | |
| 2013/0295481 A1* | 11/2013 | Kim et al. | 429/434 |
| 2014/0134510 A1* | 5/2014 | Kawabata et al. | 429/437 |
| 2015/0086886 A1* | 3/2015 | Blank et al. | 429/413 |

FOREIGN PATENT DOCUMENTS

| | | |
|---|---|---|
| JP | 08-111231 A | 4/1996 |
| JP | 10-012262 A | 1/1998 |
| JP | 10-308229 A | 11/1998 |
| JP | 2001-068141 A | 3/2001 |
| JP | 2005-285682 A | 10/2005 |
| JP | 3811382 B2 | 8/2006 |
| JP | 2008-108498 A | 5/2008 |
| JP | 2009-140614 A | 6/2009 |
| JP | 2011-249010 A | 12/2011 |
| WO | 2013/008315 A1 | 1/2013 |

* cited by examiner

*Primary Examiner* — Jeremiah Smith
(74) *Attorney, Agent, or Firm* — Carrier Blackman & Associates, P.C.; Joseph P. Carrier; William D. Blackman (57) ABSTRACT

A fuel cell stack includes a stack body formed by stacking a plurality of power generation cells. At one end of the stack body, a terminal plate, an insulating member, and an end plate are stacked. At the other end of the stack body, a terminal plate, an insulating member, and an end plate are stacked. A coolant channel is formed between the insulating member and the end plate for allowing a coolant to flow along a surface of the end plate.

6 Claims, 11 Drawing Sheets

FUEL CELL STACK

CROSS-REFERENCE TO RELATED APPLICATIONS

This application is based upon and claims the benefit of priority from Japanese Patent Applications No. 2013-202749 filed on Sep. 27, 2013 and No. 2014-177139 filed on Sep. 1, 2014, the contents all of which are incorporated herein by reference.

BACKGROUND OF THE INVENTION

1. Field of the Invention

The present invention relates to a fuel cell stack including a stack body formed by stacking a plurality of power generation cells in a stacking direction, and terminal plates, insulating members, and end plates provided at both ends of the stack body in the stacking direction. Each of the power generation cells has an electrolyte electrode assembly and a separator. The electrolyte electrode assembly includes a pair of electrodes, and an electrolyte interposed between the electrodes.

2. Description of the Related Art

For example, a solid polymer electrolyte fuel cell employs a polymer ion exchange membrane as a solid polymer electrolyte membrane. In this fuel cell, the solid polymer electrolyte membrane is interposed between an anode and a cathode to form a membrane electrode assembly (MEA). Each of the anode and the cathode includes electrolyte catalyst (electrode catalyst layer) and porous carbon (gas diffusion layer). The membrane electrode assembly is sandwiched between separators (bipolar plates) to form a power generation cell.

Normally, a predetermined number of the power generation cells are stacked together to form a stack body. At both ends of the stack body in the stacking direction, terminal plates, insulating plates, and end plates are provided to form a fuel cell stack. In use, for example, the fuel cell stack is mounted in a fuel cell electric vehicle as an in-vehicle fuel cell stack.

In some of power generation cells of the fuel cell stack, in comparison with the other power generation cells, the temperature is decreased easily due to heat radiation to the outside. For example, in the power generation cells provided at ends of the fuel cell stack in the stacking direction (hereinafter also referred to as the "end power generation cells"), since a large amount of heat is radiated to the outside, e.g., from the terminal plates and the end plates adjacent to these end power generation cells, the decrease in the temperature is significant.

Figure 11:
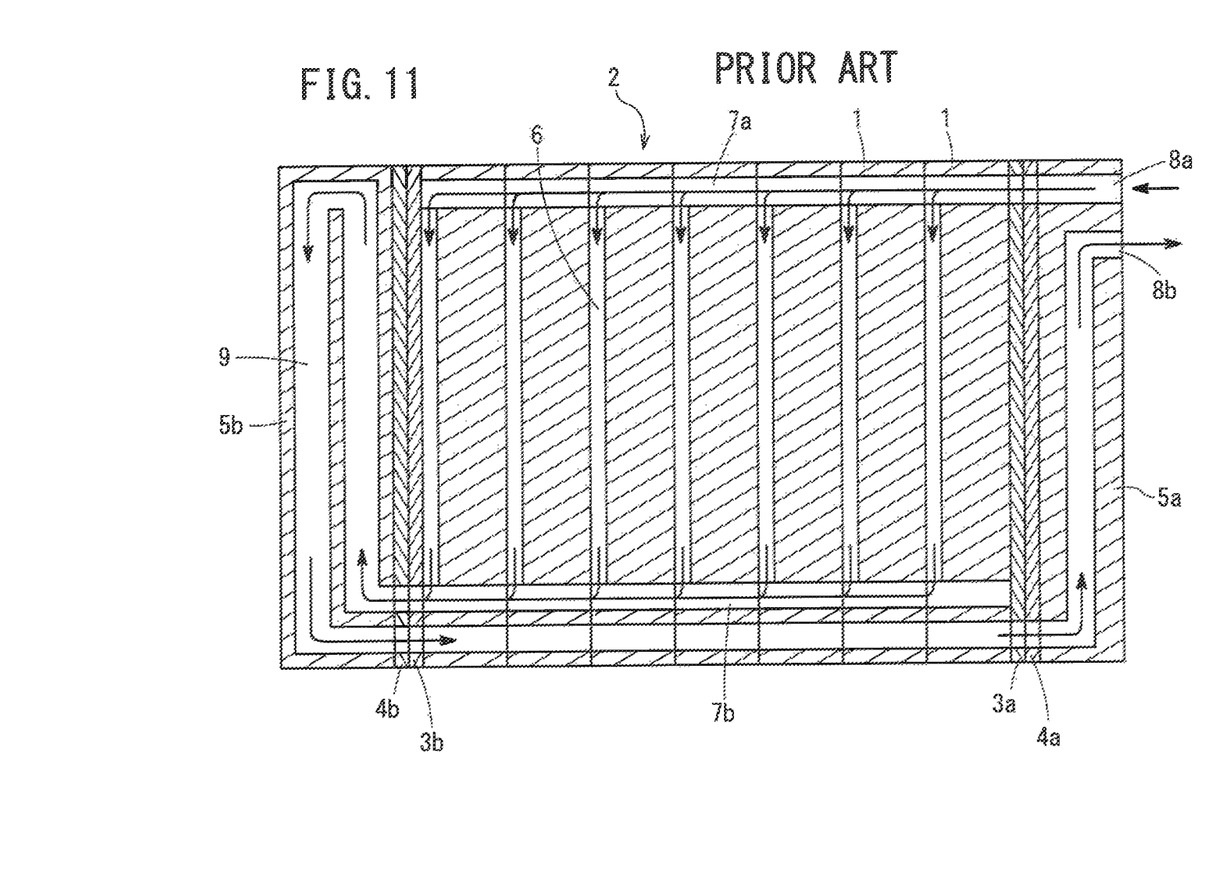
FIG. 11 is a view schematically showing a fuel cell disclosed in Japanese Laid-Open Patent Publication No. 2001-068141.

In this regard, for example, a fuel cell stack disclosed in Japanese Laid-Open Patent Publication No. 2001-068141 is known. As shown in FIG. 11, the fuel cell includes a stack body 2 formed by stacking a plurality of cell units 1. At both end of the stack body 2 in the stacking direction, a pair of current collection plates 3a, 3b are provided. Further, a pair of insulating plates 4a, 4b are provided outside the current collection plates 3a, 3b for electric insulation.

Manifold plates 5a, 5b are provided outside the insulating plates 4a, 4b to apply a force for tightening components of the entire fuel cell by the manifold plates 5a, 5b.

In each of the cell units 1, a coolant water channel 6 is formed along an electrode surface. An inlet and an outlet of the coolant water channel 6 are connected to a coolant water supply manifold 7a and a water guidance manifold 7b.

A coolant water inlet 8a and a coolant water outlet 8b are formed in the manifold plate 5a. The coolant water inlet 8a is connected to the coolant water supply manifold 7a extending in the stacking direction, and the coolant water outlet 8b is connected to the water guidance manifold 7b through a coolant water channel 9. The coolant water channel 9 is formed on the manifold plate 5b, and the coolant water channel 9 has a turn for allowing the coolant to flow upward, and then, downward.

SUMMARY OF THE INVENTION

However, in Japanese Laid-Open Patent Publication No. 2001-068141, in particular, the coolant water channel 9 is formed on the manifold plate 5b, and the coolant water channel 9 has a turn for allowing the coolant to flow upward, and then, downward. Therefore, the thickness (dimension in the stacking direction) of the manifold plate 5b is significantly increased. In the structure, the overall size of the fuel cell tends to be large in the stacking direction, size reduction of the fuel cell cannot be achieved, and the structure of the fuel cell is complicated.

The present invention has been made to solve the problem of this type, and an object of the present invention is to provide a fuel cell stack having simple and compact structure in which end power generation cells can be kept warm suitably, and the desired power generation performance can be maintained.

A fuel cell stack according to the present invention includes a stack body formed by stacking a plurality of power generation cells in a stacking direction. The electrolyte electrode assembly includes a pair of electrodes, and an electrolyte interposed between the electrodes. Each of the power generation cells has an electrolyte electrode assembly and a separator. Further, the fuel cell stack includes terminal plates, insulating members and end plates provided at both ends of the stack body in the stacking direction.

In the fuel cell stack, a coolant flow field is provided for allowing a coolant to flow along surfaces of the electrodes, and a coolant passage connected to the coolant flow field is provided for allowing the coolant to flow in the stacking direction. Further, a coolant channel is formed between the insulating member and the end plate for allowing the coolant to flow along a surface of the end plate.

In the present invention, the coolant channel is formed between the insulating member and the end plate. Therefore, structure of the coolant channel is simplified. With the simple structure, decrease in the temperature of the end power generation cell provided at the end of the stack body is reliably prevented, and it becomes possible to maintain the desired power generation performance. Further, no dedicated heat retaining plate or the like is required at the end of the fuel cell stack. Thus, structure of the fuel cell stack is simplified, and size reduction of the fuel cell stack is achieved easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
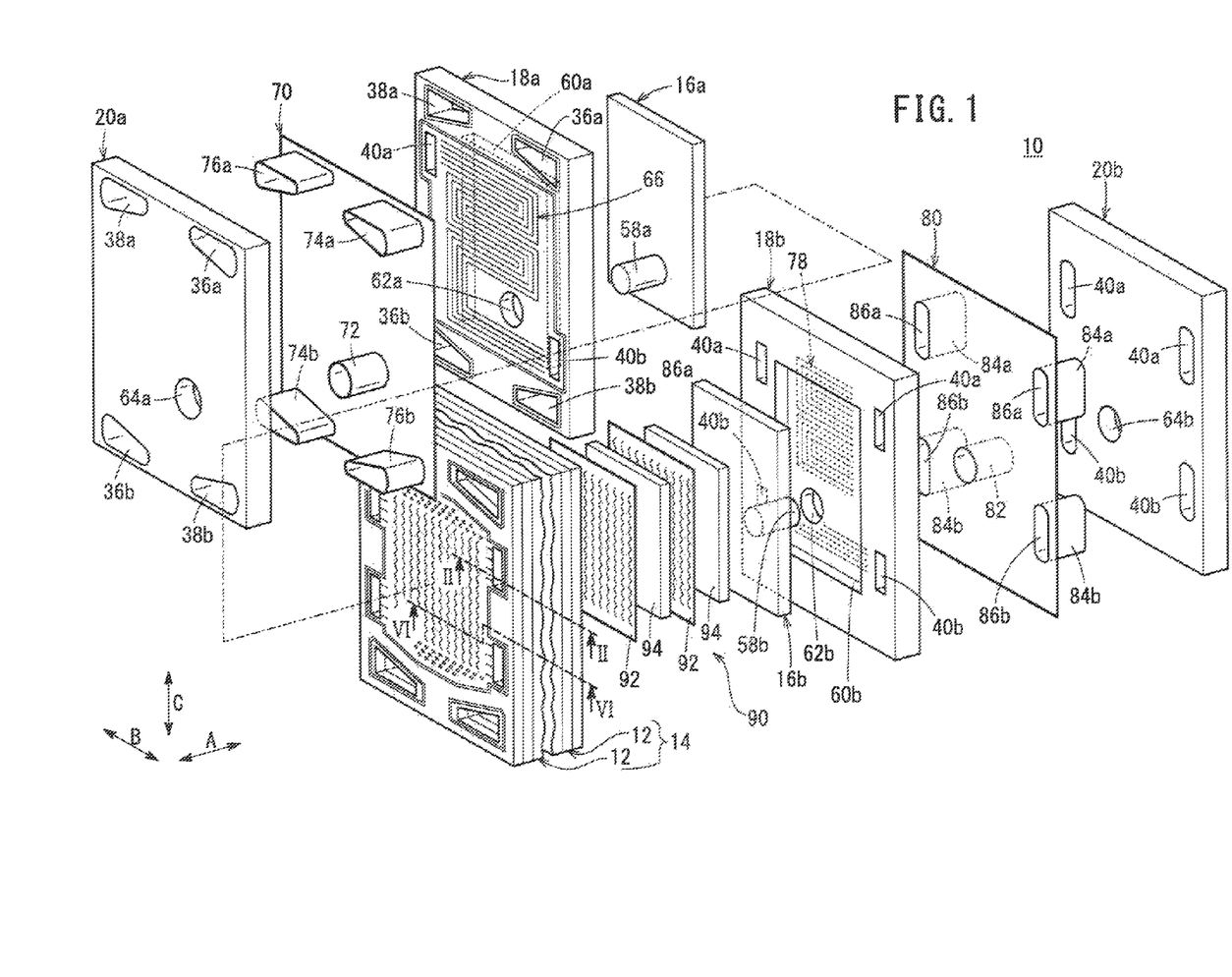
FIG. 1 is an exploded perspective view schematically showing a fuel cell stack according to a first embodiment of the present invention.

As shown in FIG. 1, a fuel cell stack 10 according to a first embodiment of the present invention includes a stack body 14 formed by stacking a plurality of power generation cells 12 in a horizontal direction indicated by an arrow A or a vertical direction indicated by an arrow C.

At one end of the stack body 14 in the stacking direction indicated by the arrow A, a terminal plate 16a is provided. An insulating member 18a is provided outside the terminal plate 16a, a lid member 70 (described later) is provided outside the insulating member 18a, and an end plate 20a is provided outside the lid member 70. At the other end of the stack body 14 in the stacking direction, a terminal plate 16b is provided. An insulating member 18b is provided outside the terminal plate 16b, a lid member 80 (described later) is provided outside the insulating member 18b, and an end plate 20b is provided outside the lid member 80 (see FIGS. 1 and 2).

Components of the fuel cell stack 10 are held together by a box-shaped casing (not shown) including the end plates 20a, 20b, e.g., each having a rectangular shape. Alternatively, components of the fuel cell stack 10 may be tightened together, e.g., by a plurality of tie-rods (not shown) extending in the direction indicated by the arrow A.

Figure 2:
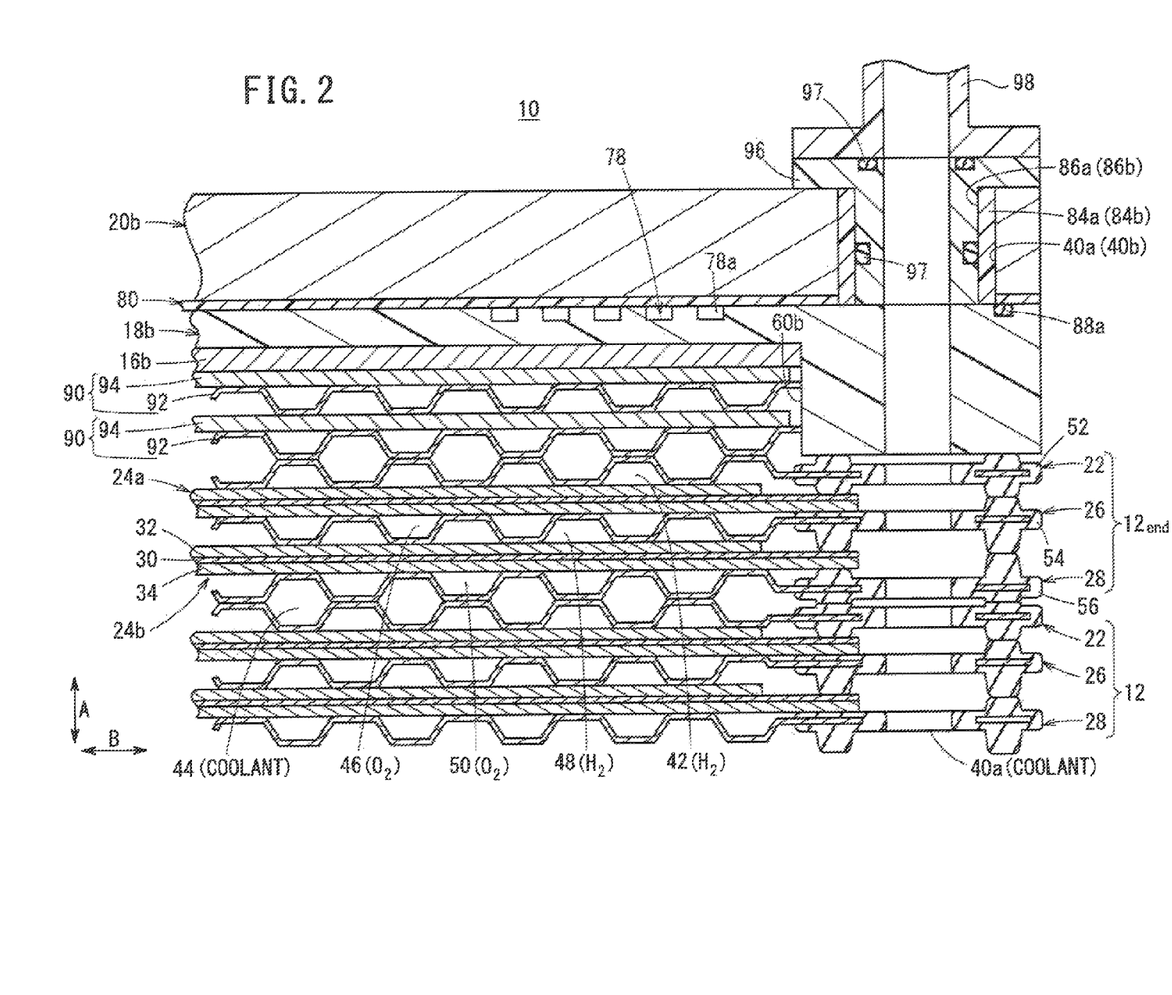
FIG. 2 is a cross sectional view showing the fuel cell stack, taken along a line II-II in FIG. 1.
Figure 3:
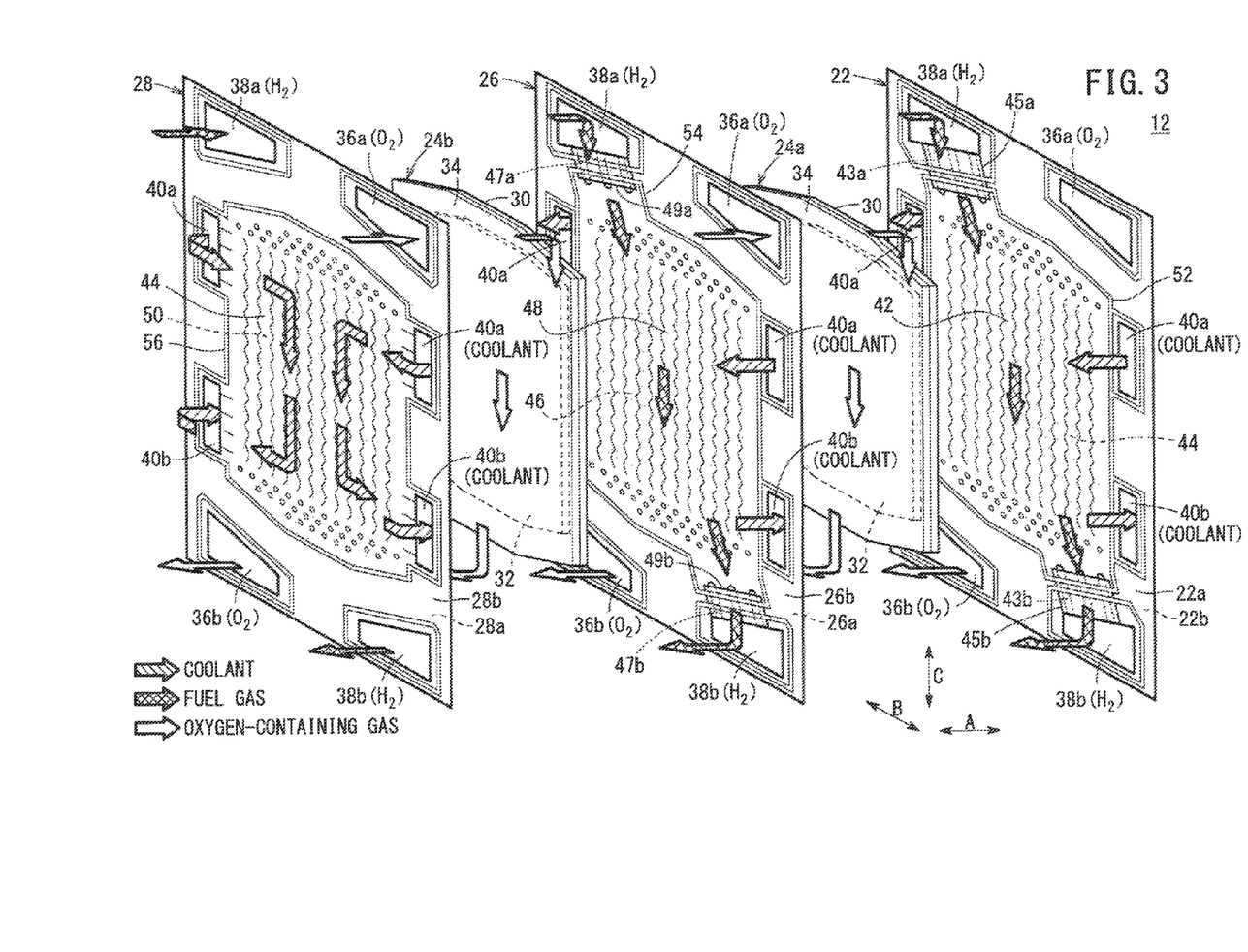
FIG. 3 is an exploded perspective view showing a power generation cell of the fuel cell stack.

As shown in FIGS. 2 and 3, each of the power generation cells 12 includes a first metal separator 22, a first membrane electrode assembly (electrolyte electrode assembly) (MEA) 24a, a second metal separator 26, a second membrane electrode assembly (MEA) 24b, and a third metal separator 28. The first metal separator 22, the second metal separator 26, and the third metal separator 28 are longitudinally elongated metal plates such as steel plates, stainless steel plates, aluminum plates, or plated steel plates. Instead of the metal plates, for example, carbon separators may be used. It should be noted that one power generation cell may be formed by sandwiching one MEA between two separators.

As shown in FIG. 2, each of the first membrane electrode assembly 24a and the second membrane electrode assembly 24b includes a solid polymer electrolyte membrane 30 formed by impregnating a thin membrane of perfluorosulfonic acid with water, for example. The solid polymer electrolyte membrane 30 is sandwiched between the anode 32 and the cathode 34. Each of the first membrane electrode assembly 24a and the second membrane electrode assembly 24b is an MEA having different sizes of components where the surface area (plane surface size) of the anode 32 is smaller than the surface area (plane surface size) of the cathode 34. Alternatively, the surface area (plane surface size) of the anode 32 may be larger than the surface area (plane surface size) of the cathode 34.

Each of the anode 32 and the cathode 34 has a gas diffusion layer (not shown) such as a carbon paper and an electrode catalyst layer (not shown) of platinum alloy supported on porous carbon particles. The carbon particles are deposited uniformly on the surface of the gas diffusion layer. The electrode catalyst layer of the anode 32 and the electrode catalyst layer of the cathode 34 are fixed to both surfaces of the solid polymer electrolyte membrane 30, respectively.

As shown in FIG. 3, at an upper end of the power generation cell 12 in a longitudinal direction indicated by an arrow C, an oxygen-containing gas supply passage 36a and a fuel gas supply passage 38a are provided. The oxygen-containing gas supply passage 36a and the fuel gas supply passage 38a extend through the power generation cell 12 in the direction indicated by the arrow A. For example, an oxygen-containing gas is supplied through the oxygen-containing gas supply passage 36a. For example, a fuel gas such as a hydrogen-containing gas is supplied through the fuel gas supply passage 38a.

At a lower end of the power generation cell 12 in the longitudinal direction indicated by the arrow C, a fuel gas discharge passage 38b for discharging the fuel gas and an oxygen-containing gas discharge passage 36b for discharging the oxygen-containing gas are provided. The fuel gas discharge passage 38b and the oxygen-containing gas discharge passage 36b extend through the power generation cell 12 in the direction indicated by the arrow A. At upper positions of both ends of the power generation cell 12 in a lateral direction indicated by an arrow B, a pair of coolant supply passages 40a are provided. The coolant supply passages 40a extend through the power generation cells 12 in the direction indicated by the arrow A. At lower positions of both ends of the power generation cell 12 in the lateral direction indicated by the arrow B, a pair of coolant discharge passages 40b are provided. The coolant discharge passages 40b extend through the power generation cells 12 in the direction indicated by the arrow A. It should be noted that the positions of the fuel gas supply passage 38a and the fuel gas discharge passage 38b may be switched.

The first metal separator 22 has a first fuel gas flow field 42 on its surface 22a facing the first membrane electrode assembly 24a. The first fuel gas flow field 42 is connected to the fuel gas supply passage 38a and the fuel gas discharge passage 38b.

The fuel gas supply passage 38a is connected to the first fuel gas flow field 42 through a plurality of inlet connection grooves 43a, and the fuel gas discharge passage 38b is connected to the first fuel gas flow field 42 though a plurality of outlet connection grooves 43b. The inlet connection grooves 43a and the outlet connection grooves 43b are covered by a lid 45a and a lid 45b, respectively. A surface 22b of the first metal separator 22 forms part of a coolant flow field 44 connecting the pair of coolant supply passages 40a and the pair of coolant discharge passages 40b.

The second metal separator 26 has a first oxygen-containing gas flow field 46 on its surface 26a facing the first membrane electrode assembly 24a. The first oxygen-containing gas flow field 46 is connected to the oxygen-containing gas supply passage 36a and the oxygen-containing gas discharge passage 36b.

The second metal separator 26 has a second fuel gas flow field 48 on its surface 26b facing the second membrane electrode assembly 24b. The second fuel gas flow field 48 is connected to the fuel gas supply passage 38a and the fuel gas discharge passage 38b. The fuel gas supply passage 38a is connected to the second fuel gas flow field 48 through a plurality of inlet connection grooves 47a, and the fuel gas discharge passage 38b is connected to the second fuel gas flow field 48 though a plurality of outlet connection grooves 47b. The inlet connection grooves 47a and the outlet connection grooves 47b are covered by a lid 49a and a lid 49b, respectively.

The third metal separator 28 has a second oxygen-containing gas flow field 50 on its surface 28a facing the second membrane electrode assembly 24b. The second oxygen-containing gas flow field 50 is connected to the oxygen-containing gas supply passage 36a and the oxygen-containing gas discharge passage 36b. A surface 28b of the third metal separator 28 forms a part of the coolant flow field 44.

A first seal member 52 is formed integrally with the surfaces 22a, 22b of the first metal separator 22, around the outer end of the first metal separator 22. A second seal member 54 is formed integrally with surfaces 26a, 26b of the second metal separator 26, around the outer end of the second metal separator 26. A third seal member 56 is formed integrally with the surfaces 28a, 28b of the third metal separator 28, around the outer end of the third metal separator 28.

For example, each of the first seal member 52, the second seal member 54, and the third seal member 56 is an elastic seal member made of seal material, cushion material, or packing material such as an EPDM rubber (Ethylene Propylene Diene Monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 1, terminal units 58a, 58b are provided at positions spaced from the center (or provided at the center) in the surfaces of the terminal plates 16a, 16b, respectively. Preferably, the terminal units 58a, 58b are provided closer to the coolant discharge passages 40b in comparison with the coolant supply passages 40a of the coolant flow field 44.

The insulating members 18a, 18b are made of insulating material such as polycarbonate (PC) or phenolic resin. A rectangular recess 60a is formed at the center of the insulating member 18a, in a surface facing the terminal plate 16a. Further, the insulating member 18a has a hole 62a connected to the recess 60a. The terminal unit 58a of the terminal plate 16a is exposed to the outside through the hole 62a of the insulating member 18a, a hole of the lid member 70 described later, and a hole 64a of the end plate 20a.

A rectangular recess 60b is formed at the center of the insulating member 18b, in a surface facing the terminal plate 16b. Further, the insulating member 18b has a hole 62b connected to the recess 60b. The terminal unit 58b of the terminal plate 16b is exposed to the outside through the hole 62b of the insulating member 18b, a hole of the lid member 80, and a hole 64b of the end plate 20b.

The oxygen-containing gas supply passage 36a, the oxygen-containing gas discharge passage 36b, the fuel gas supply passage 38a, and the fuel gas discharge passage 38b extend through the end plate 20a. The pair of coolant supply passages 40a and the pair of coolant discharge passages 40b extend through the end plate 20b.

Figure 4:
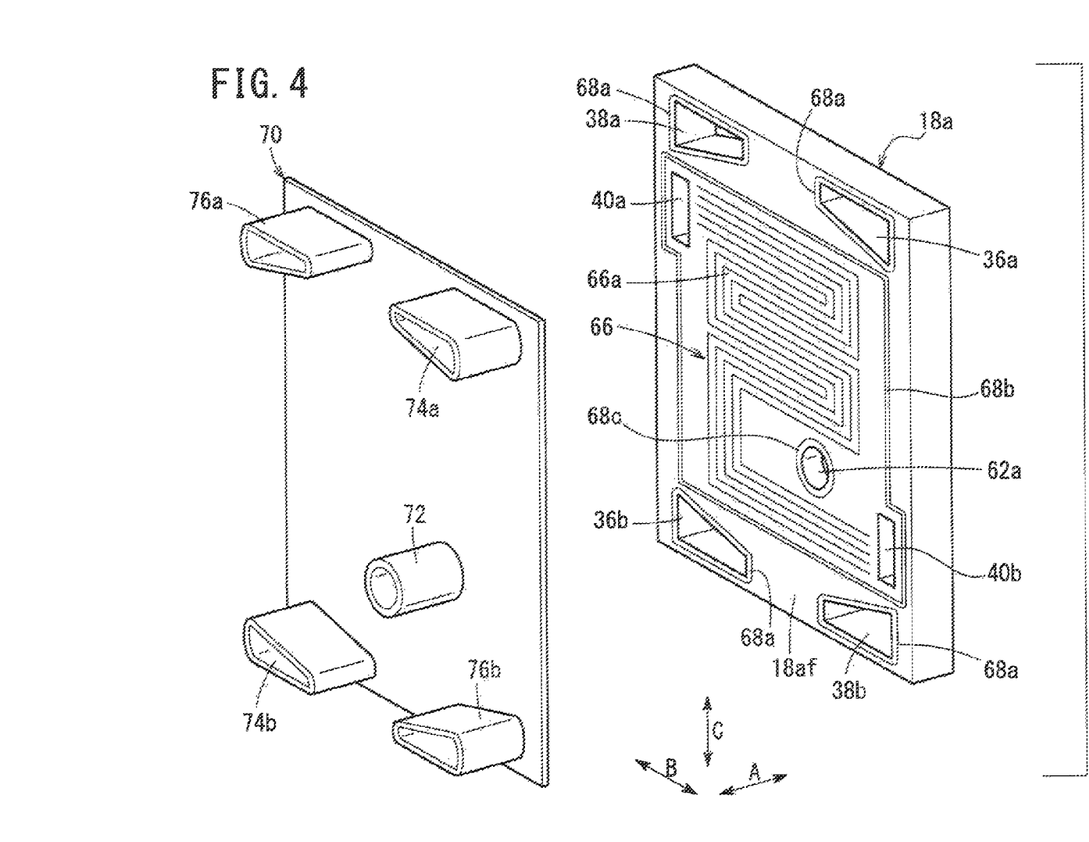
FIG. 4 is an exploded perspective view showing an insulating member and a lid member at one end of the fuel cell stack.

As shown in FIG. 4, the oxygen-containing gas supply passage 36a, the oxygen-containing gas discharge passage 36b, the fuel gas supply passage 38a, and the fuel gas discharge passage 38b extend through the insulating member 18a. Further, one of the coolant supply passages 40a and one of the coolant discharge passages 40b extend through the insulating member 18a at diagonally opposite positions.

The insulating member 18a has a plurality of coolant channel grooves 66a on its surface 18af facing the end plate 20a. The coolant channel grooves 66a are connected to the one coolant supply passage 40a and the one coolant discharge passage 40b provided at the diagonally opposite positions. The inlet side of the coolant channel grooves 66a is connected to the coolant supply passage 40a, and the outlet side of the coolant channel grooves 66b is connected to the coolant discharge passage 40b. The coolant flows in the coolant channel grooves 66a in the same direction as the coolant flowing from the inlet side to the outlet side of the coolant flow field 44 in each of the power generation cells 12. Specifically, the coolant channel grooves 66a have a serpentine pattern for allowing the coolant to flow from the coolant supply passage 40a to the coolant discharge passage 40b substantially in the direction indicated by the arrow C (in the direction along the long side), and flow back and forth, i.e., in a serpentine manner in the horizontal direction.

Seal members 68a are provided on the surface 18af of the insulating member 18a, around the oxygen-containing gas supply passage 36a, the oxygen-containing gas discharge passage 36b, the fuel gas supply passage 38a, and the fuel gas discharge passage 38b, respectively. A seal member 68b is provided on the surface 18af, around the coolant supply passage 40a, coolant discharge passage 40b, and the coolant channel grooves 66a. Further, a seal member 68c is provided on the surface 18af, around the hole 62a.

A lid member 70 is stacked on the insulating member 18a so as to contact the surface 18af of the insulating member 18a. Therefore, the lid member 70 covers the coolant channel grooves 66a to form the coolant channel 66. The lid member 70 has a plate shape, and is made of insulating material like the insulating member 18a. The lid member 70 is provided coaxially with the hole 62a of the insulating member 18a. A cylindrical terminal collar 72 is formed by expansion from the lid member 70. The cylindrical terminal collar 72 is fitted to the hole 64a of the end plate 20a. It should be noted that the terminal collar 72 may be a member separate from the lid member 70 and fixed to the lid member 70. The lid member 70 may be an insulating member having a flat plate shape.

Substantially triangular oxygen-containing gas collars 74a and 74b are fitted in and expanded from the lid member 70. The oxygen-containing gas collars 74a and 74b are inserted into the oxygen-containing gas supply passage 36a and the oxygen-containing gas discharge passage 36b of the end plate 20a, respectively. Substantially triangular fuel gas collars 76a and 76b are fitted in and expanded from the lid member 70. The fuel gas collars 76a and 76b are inserted into the fuel gas supply passage 38a and the fuel gas discharge passage 38b of the end plate 20a, respectively. Preferably, the oxygen-containing gas collars 74a and 74b, and the fuel gas collars 76a, 76b are members separate from the lid member 70.

Figure 5:
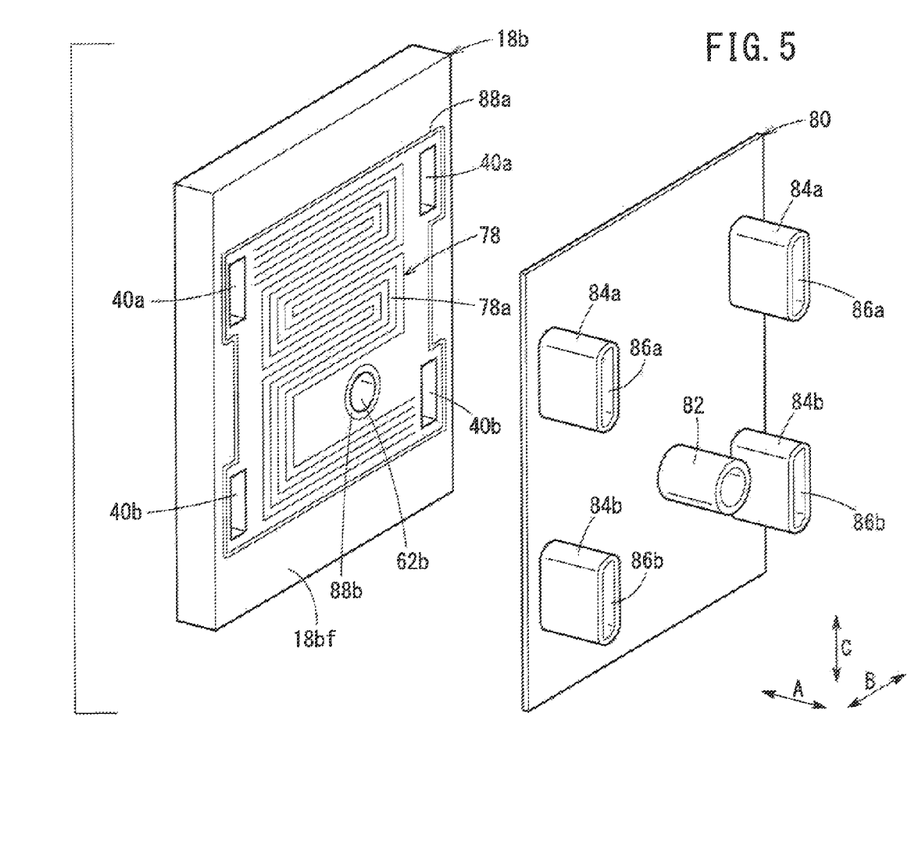
FIG. 5 is an exploded perspective view showing an insulating member and a lid member at the other end of the fuel cell stack.

As shown in FIG. 5, the pair of coolant supply passages 40a and the pair of coolant discharge passages 40b extend through the insulating member 18b. A plurality of coolant channel grooves 78a are formed on the surface 18bf of the insulating member 18b facing the end plate 20b. The coolant channel grooves 78a are connected between one of the coolant supply passages 40a and one of the coolant discharge passages 40b provided at a position diagonally opposite to this coolant supply passage 40a. The coolant supply passage 40a connected to the coolant channel grooves 78a and the coolant supply passage 40a connected to the coolant channel grooves 66a are different passages. Likewise, the coolant discharge passage 40b connected to the coolant channel grooves 78a and the coolant discharge passage 40b connected to the coolant channel grooves 66a are different passages.

The inlet side of the coolant channel grooves 78a is connected to the one coolant supply passage 40a, and the outlet side of the coolant channel grooves 78a is connected to the one coolant discharge passage 40b. The coolant flows in the coolant channel grooves 78a in the same direction as the coolant flowing from the inlet side to the outlet side in the coolant flow field 44 in each of the power generation cells 12. Specifically, the coolant channel grooves 78a have a serpentine pattern for allowing the coolant to flow from the coolant supply passage 40a to the coolant discharge passage 40b substantially in the direction indicated by the arrow C (in the direction along the long side), and flow back and forth, i.e., in a serpentine manner in the horizontal direction. The lid member 80 is stacked on the surface 18bf. Therefore, the lid member 80 covers the coolant channel grooves 78a to form a coolant channel 78.

The lid member 80 has a substantially flat plate shape. The lid member 80 is made of insulating material like the insulating member 18b. A circular terminal collar 82 is formed by expansion from the lid member 80, and the terminal collar 82 is inserted into the hole 64b of the end plate 20b. The terminal collar 82 may be a member separate from lid member 80 and fixed to the lid member 80.

A pair of substantially oblong coolant collars 84a and a pair of substantially oblong coolant collars 84b are fitted in and expanded from the lid member 80. The coolant collars 84a are inserted into the pair of coolant supply passages 40a of the end plate 20b, and the coolant collars 84b are inserted into the pair of coolant discharge passages 40b of the end plate 20b. Preferably, the pair of coolant collars 84a and the pair of coolant collars 84b are members separate from the lid member 80.

Each of the coolant collars 84a has a coolant supply hole 86a connected to the coolant supply passage 40a of the stack body 14. Each of the coolant collars 84b has a coolant discharge hole 86b connected to the coolant discharge passage 40b of the stack body 14.

A seal member 88a is formed on the surface 18bf of the insulating member 18b, around the coolant supply passages 40a, the coolant discharge passages 40b, and the coolant channel 78. A seal member 88b is formed on the surface 18bf of the insulating member 18b, around the hole 62b.

As shown in FIGS. 1 and 2, an electrically conductive heat insulating member 90 and the terminal plate 16b are placed in the recess 60b of the insulating member 18b. For example, the heat insulating member 90 at least includes first heat insulating members 92 and second heat insulating members 94 made of different materials, and the first heat insulating members 92 and the second heat insulating members 94 are stacked alternately. The first heat insulating members 92 comprise, e.g., metal plates, and the second heat insulating members 94 comprise, e.g., carbon plates.

It should be noted that the heat insulating member 90 may be formed by stacking two types of corrugated plates alternately. For example, two pairs (or three pairs) of corrugated plates may be stacked. Further, as long as the heat insulating member 90 is an electrically conductive member having pores, honeycomb shaped metal (honeycomb member) or porous carbon (e.g., carbon paper) may be used for the heat insulating member 90. The heat insulating member 90 may comprise a single plate, or may comprise a plurality of stacked plates.

As shown in FIG. 2, the coolant collar 84a of the lid member 80 is inserted into the coolant supply passage 40a of the end plate 20b, and a collar member 96 is attached to the hole 86a of the coolant collar 84a through a seal member 97. A coolant manifold 98 is connected to the collar member 96. In the same manner, the collar member 96 is fixed to the coolant collar 84b inserted into the coolant discharge passage 40b through a seal member 97. The coolant collars 84a, 84b are not essential. The coolant collars 84a, 84b should be provided as necessary.

Figure 6:
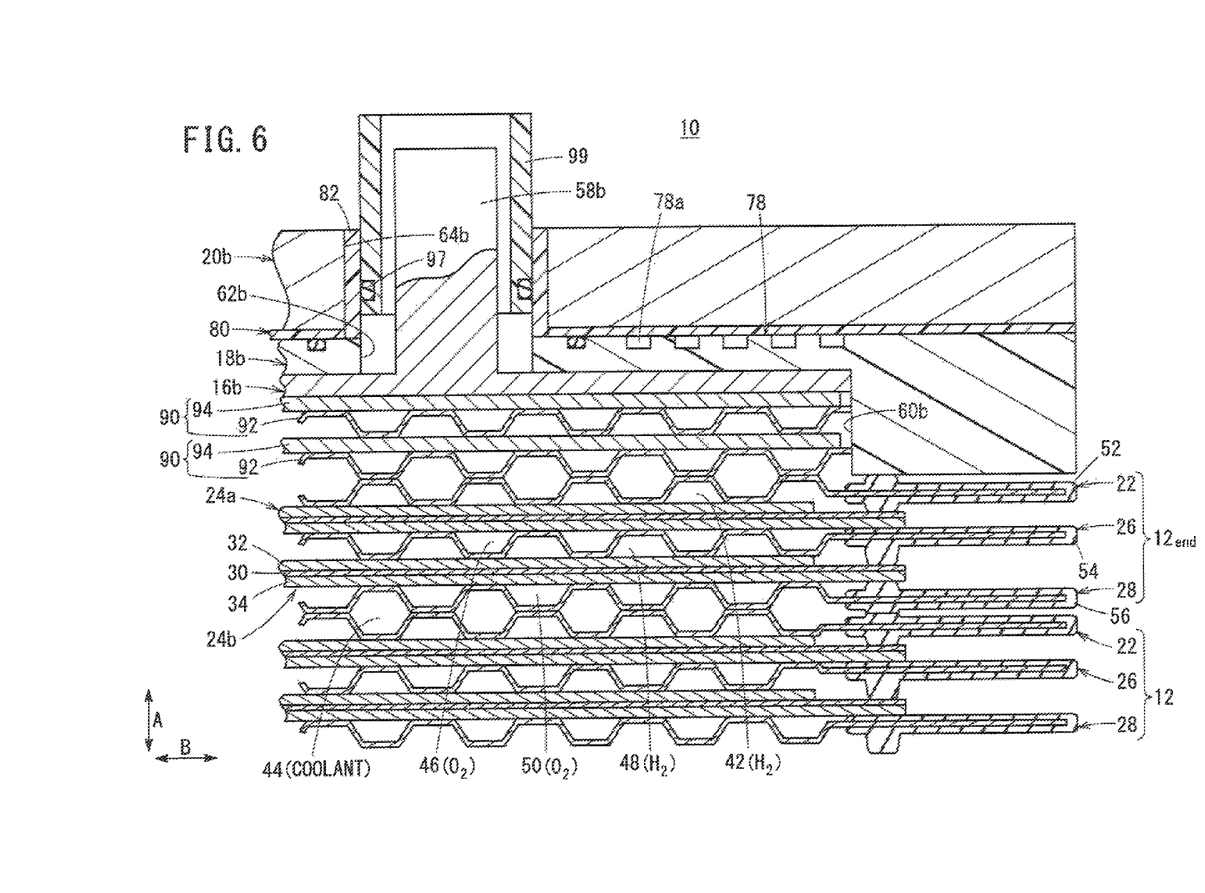
FIG. 6 is a cross sectional view showing components including the insulating member at the other end of the fuel cell stack, taken along a line VI-VI in FIG. 1.

As shown in FIG. 6, the terminal collar 82 of the lid member 80 is inserted into the hole 64b of the end plate 20b. A cylindrical member 99 is fitted to the terminal collar 82 through the seal member 97. The cylindrical member 99 surrounds the terminal unit 58b, and the front end of the cylindrical member 99 extends beyond the front end of the terminal unit 58b. In the case where the terminal unit 58b is connected to the outer end of the terminal plate 16b by cutting outer circumference of the insulating member 18b, the hole 62b may not be provided.

Operation of the fuel cell stack 10 will be described below.

Firstly, as shown in FIG. 1, an oxygen-containing gas is supplied to the oxygen-containing gas supply passage 36a of the end plate 20a. A fuel gas such as a hydrogen-containing gas is supplied to the fuel gas supply passage 38a of the end plate 20a. Further, a coolant such as pure water, ethylene glycol, or oil is supplied to the pair of coolant supply passages 40a of the end plate 20b.

As shown in FIG. 3, the oxygen-containing gas is supplied into the oxygen-containing gas supply passage 36a to the first oxygen-containing gas flow field 46 of the second metal separator 26 and the second oxygen-containing gas flow field 50 of the third metal separator 28. The oxygen-containing gas flows in the direction indicated by the arrow C, and the oxygen-containing gas is supplied to the cathodes 34 of the first membrane electrode assembly 24a and the second membrane electrode assembly 24b.

In the meanwhile, the fuel gas is supplied from the fuel gas supply passage 38a to the first fuel gas flow field 42 of the first metal separator 22 and the second fuel gas flow field 48 of the second metal separator 26. The fuel gas flows along the first fuel gas flow field 42 and the second fuel gas flow field 48 in the direction indicated by the arrow C, and the fuel gas is supplied to the anodes 32 of the first membrane electrode assembly 24a and the second membrane electrode assembly 24b.

Thus, in each of the first membrane electrode assembly 24a and the second membrane electrode assembly 24b, the oxygen-containing gas supplied to each cathode 34, and the fuel gas supplied to each anode 32 are consumed in electrochemical reactions at catalyst layers of the cathode 34 and the anode 32 for generating electricity.

Then, the oxygen-containing gas after being subjected to the electrochemical reaction at the cathode 34 is discharged along the oxygen-containing gas discharge passage 36b in the direction indicated by the arrow A. Likewise, the fuel gas after being subjected to the electrochemical reaction at the anode 32 is discharged along the fuel gas discharge passage 38b in the direction indicated by the arrow A.

Further, as shown in FIG. 3, the coolant supplied to each of the coolant supply passages 40a flows into the coolant flow field 44 formed between the first metal separator 22 and the third metal separator 28 that are adjacent to each other. Firstly, in the coolant flow field 44, the coolant flows in the direction indicated by the arrow B such that the coolant from one of the coolant supply passages 40a and the coolant from the other of the coolant supply passages 40a move closer to each other. The coolant flows in the longitudinal direction of the separators indicated by the arrow C, while cooling the first membrane electrode assembly 24a and the second membrane electrode assembly 24b. Then, the coolant is diverged to flow away from each other in the direction indicated by the arrow B toward one of the coolant discharge passages 40b and the other of the coolant discharge passages 40b.

In the first embodiment, for example, as shown in FIGS. 2 and 5, the coolant channel 78 is formed between the insulating member 18b and the end plate 20b. Specifically, the coolant channel 78 is formed between the plurality of coolant channel grooves 78a formed on the surface 18bf of the insulating member 18b and the thin lid member 80 stacked on the surface 18bf.

Thus, the structure of the coolant channel 78 is simplified effectively. Therefore, as shown in FIG. 2, with the simple structure, by supplying the coolant kept at a certain temperature to the coolant channel 78, decrease in the temperature of an end power generation cell $12_{end}$ provided at the end of the stack body 14 is reliably prevented, and it becomes possible to maintain the desired power generation performance. Further, no dedicated heat retaining plate or the like is required at the end of the fuel cell stack 10. Thus, structure of the fuel cell stack 10 is simplified, and size reduction of the fuel cell stack 10 is achieved easily.

Further, as the insulating member, the lid member 80 is interposed between the insulating member 18b and the end plate 20b. In the structure, the coolant flowing through the coolant channel 78 does not contact the end plate 20b, so that it is possible to prevent corrosion of the end plate 20b, and suppress liquid leakage.

Further, in the first embodiment, as shown in FIG. 6, the terminal unit 58b of the terminal plate 16b is inserted into the lid member 80, and the terminal collar 82 extending through the hole 64b of the end plate 20b is provided. In the structure, the lid member 80 can guide the terminal unit 58b to the outside while providing water proofing and insulation of the terminal unit 58b.

Further, in the first embodiment, as shown in FIG. 2, the coolant collar 84a is provided for the lid member 80, and the coolant collar 84a is inserted into the coolant supply passage 40a of the end plate 20b. Thus, sealing is performed using the collar member 96 of the coolant manifold 98 and the coolant collar 84a, and improvement in the water proofing function is achieved suitably.

The lid member 70 is provided for the insulating member 18a (see FIG. 4). Therefore, also in the insulating member 18a, the same advantages as in the case of the insulating member 18b described above are obtained.

Figure 7:
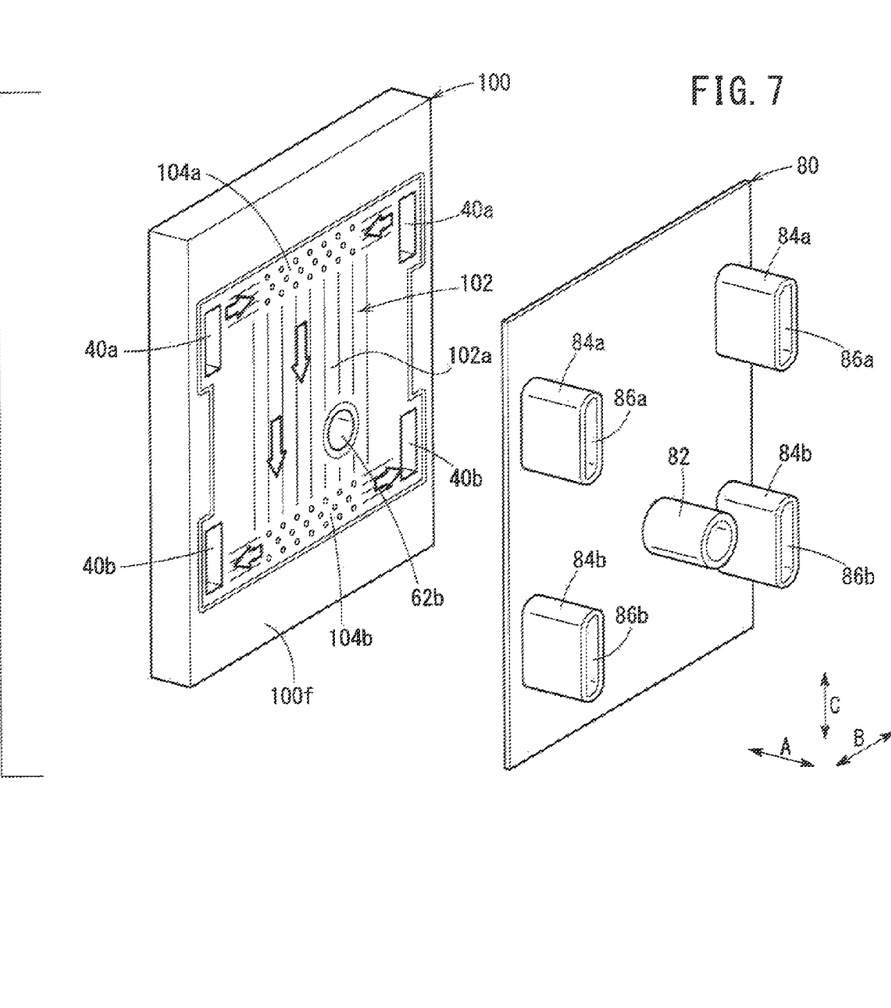
FIG. 7 is an exploded perspective view showing an insulating member and a lid member of a fuel cell stack according to a second embodiment of the present invention.

FIG. 7 is an exploded perspective view showing an insulating member 100 and a lid member 80 of a fuel cell stack according to a second embodiment of the present invention. It should be noted that the insulating member 100 is used instead of the insulating member 18b of the first embodiment. Another insulating member 18a has the same structure as an insulating member 100.

The insulating member 100 has a coolant channel grooves 102a on its surface 100f facing the lid member 80. The coolant channel grooves 102a form a coolant channel 102. The coolant channel grooves 102a includes a portion where the grooves extend from one of the pair of coolant supply passages 40a and the grooves extend from the other of the pair of coolant supply passages 40a toward each other in the direction indicated by the arrow B, a portion where the grooves extend in the direction indicated by the arrow C, and a portion where the grooves extend away from each other in the direction indicated by the arrow B toward the pair of coolant discharge passages 40b. Accordingly, the coolant flows along the arrows shown in FIG. 7.

At upper and lower portions of the coolant channel grooves 102a, bosses 104a, 104b may be provided in areas where both of grooves in the horizontal direction and grooves in the vertical direction are present. The lid member 80 is stacked on the insulating member 100 to form the coolant channel 102 between the insulating member 100 and the lid member 80.

The flow direction in the coolant channel 102 is substantially the same as the flow direction in the coolant flow field 44 of each power generation cell 12. Therefore, in the coolant channel 102, the coolant flows in the same manner as the coolant in each coolant flow field 44 of the fuel cell stack. Thus, the coolant flows smoothly and suitably as a whole.

Figure 8:
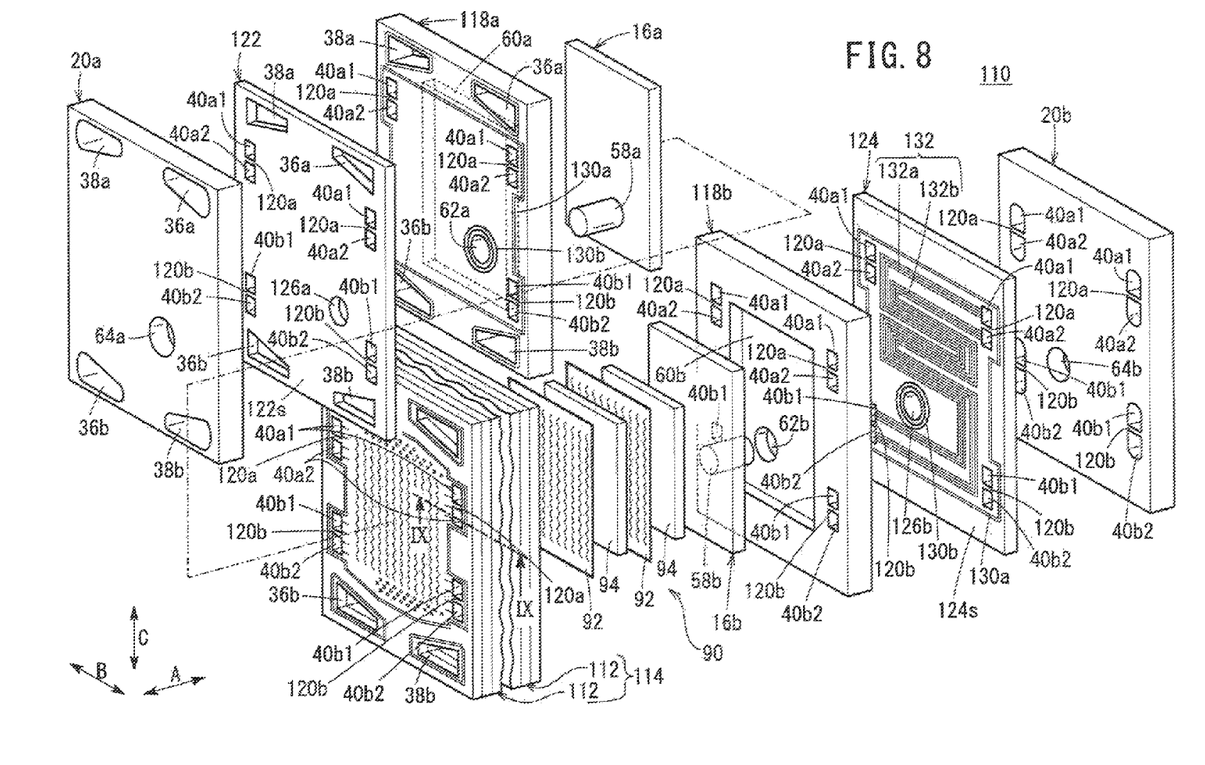
FIG. 8 is an exploded perspective view schematically showing a fuel cell stack according to a third embodiment of the present invention.

FIG. 8 is an exploded perspective view schematically showing a fuel cell stack 110 according to a third embodiment of the present invention. The constituent elements that are identical to those of the fuel cell stack 10 according to the first embodiment are labeled with the same reference numeral and description thereof is omitted.

The fuel cell stack 110 includes a stack body 114 formed by stacking a plurality of power generation cells 112 in a horizontal direction indicated by an arrow A or in a vertical direction indicated by an arrow C. At one end of the stack body 114 in the stacking direction indicated by the arrow A, a terminal plate 16a is provided. An insulating member 118a is provided outside the terminal plate 16a, a lid member 122 (described later) is provided outside the insulating member 118a, and an end plate 20a is provided outside the insulating member 118a. At the other end of the stack body 114, a terminal plate 16b is provided. An insulating member 118b is provided outside the terminal plate 16b, a lid member 124 (described later) is provided outside the insulating member 118b, and an end plate 20b is provided outside the lid member 124 (see FIGS. 8 and 9).

In each of the power generation cells 112, ribs 120a are formed at both ends of the upper side in the direction indicated by the arrow C. The ribs 120a are provided at intermediate positions of vertically elongated rectangles. Therefore, separate coolant supply passages 40a1, 40a2 divided by the ribs 120a are formed. In each of the power generation cells 112, ribs 120b are formed at both ends of the lower side in the direction indicated by the arrow C. The ribs 120b are provided at intermediate positions of vertically elongated rectangles. Therefore, separate coolant discharge passages 40b1, 40b2 divided by the ribs 120b are formed.

The insulating member 118a has a flat surface opposite to a surface having a recess 60a (a surface facing the end plate 20a), and no coolant channel grooves are provided on the flat surface. A lid member 122 is provided between the insulating member 118a and the end plate 20a, and a lid member 124 is provided between the insulating member 118b and the end plate 20b.

Figure 10:
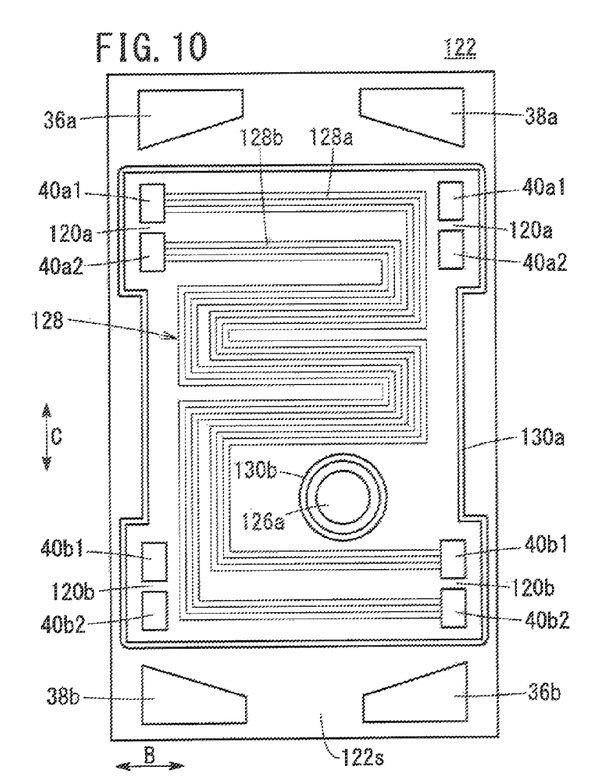
FIG. 10 is a front view showing a lid member of the fuel cell stack.

As shown in FIGS. 8 and 10, the lid member 122 has a hole 126a, and a terminal unit 58a is inserted into the hole 126a. The lid member 122 has a plurality of coolant channel grooves 128a on its surface 122s facing the insulating member 118a. The coolant channel grooves 128a are connected to one of the coolant supply passages 40a1 and one of the coolant discharge passages 40b1 provided at diagonally opposite positions. Likewise, a plurality of coolant channel grooves 128b are formed on a surface 122s of the lid member 122. The coolant channel grooves 128b are connected to one of the coolant supply passages 40a2 and one of the coolant discharge passages 40b2 provided at diagonally opposite positions.

Each of the coolant channel grooves 128a, 128b has a serpentine pattern for allowing the coolant to flow back and forth in the direction indicated by the arrow B parallel to a surface of the end plate 20a. The lid member 122 contacts the insulating member 118a to form a coolant channel 128 between the lid member 122 and the insulating member 118a. Seal members 130a, 130b are interposed between the lid member 122 and the insulating member 118a.

As shown in FIG. 8, the lid member 124 has a hole 126b, and the terminal unit 58b is inserted into the hole 126b. The lid member 124 has a plurality of coolant channel grooves 132a on its surface 124s facing the insulating member 118b. The coolant channel grooves 132a are connected to one of the coolant supply passages 40a1 and one of the coolant discharge passages 40b1 provided at diagonally opposite positions. Likewise, a plurality of coolant channel grooves 132b are formed on a surface 124s of the lid member 124. The coolant channel grooves 132b are connected to one of the coolant supply passages 40a2 and one of the coolant discharge passages 40b2 provided at diagonally opposite positions.

Figure 9:
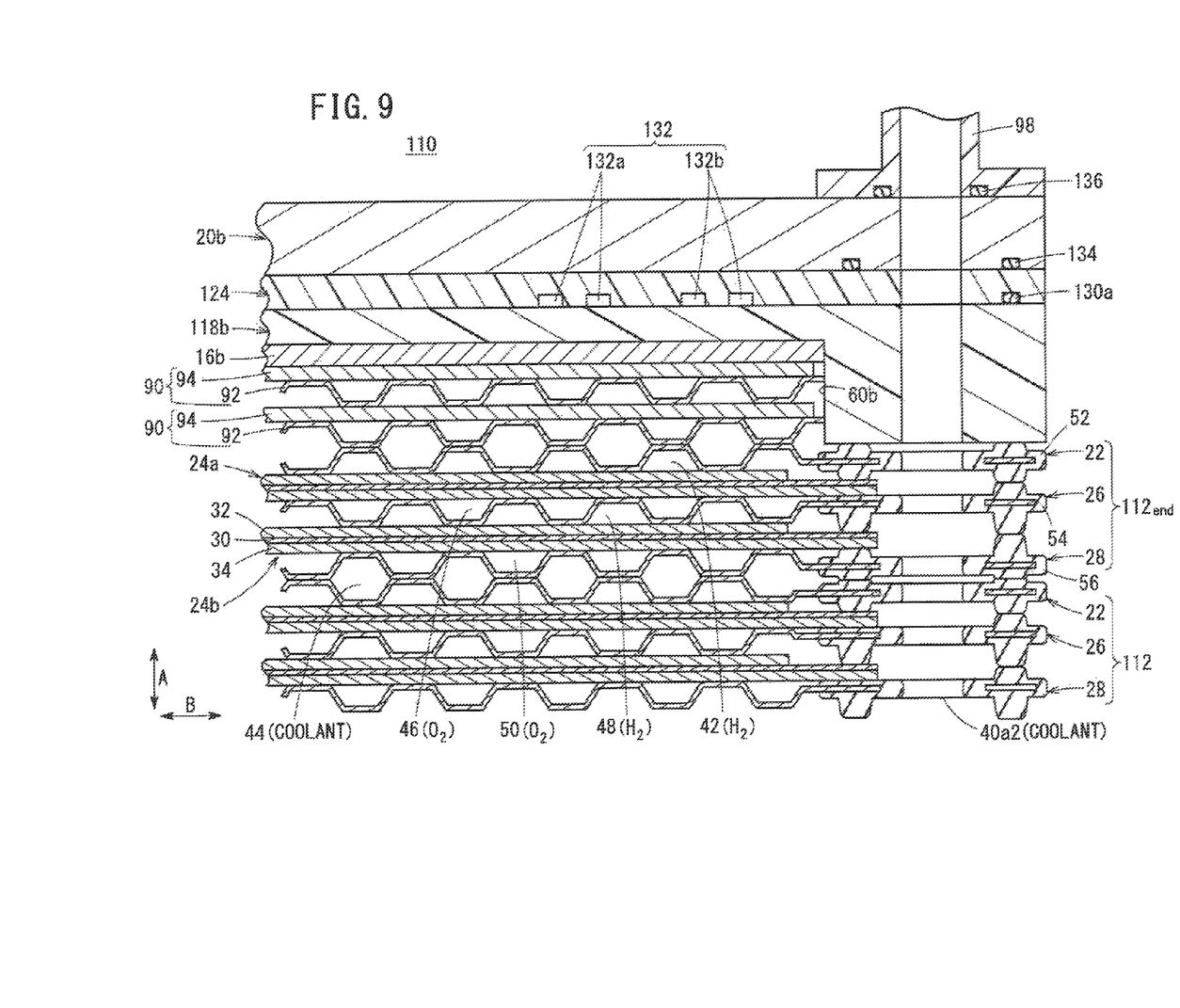
FIG. 9 is a cross sectional view showing the fuel cell stack, take along a line IX-IX in FIG. 8.

Each of the coolant channel grooves 132a, 132b has a serpentine pattern for allowing the coolant to flow back and forth in the direction indicated by the arrow B parallel to a surface of the end plate 20b. The lid member 124 contacts the insulating member 118b to form a coolant channel 132 between the lid member 124 and the insulating member 118b. Seal members 130a, 130b are interposed between the lid member 124 and the insulating member 118b. As shown in FIG. 9, a coolant seal member 134 is interposed between the lid member 124 and the end plate 20b, and a coolant manifold 98 is fixed to the end plate 20b such that a seal member 136 is interposed between the coolant manifold 98 and the end plate 20b.

In the third embodiment, the same advantages as in the case of the first embodiment are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack including:
   a stacked body in which a plurality of power generation cells are stacked in a stacking direction, each of the plurality of power generation cells including a separator and an electrolyte electrode assembly which includes an electrolyte and a pair of electrodes sandwiching the electrolyte therebetween, the stacked body having a first end portion and a second end portion opposite to the first end portion in the stacking direction;
   a terminal plate, an insulating member, and an end plate provided in that order on each end portion of the stack body; and
   a coolant flow field for allowing a coolant to flow along surfaces of the electrodes, and coolant passage connected to the coolant flow field for allowing the coolant to flow in the stacking direction, wherein a coolant channel is formed between the insulating member and a lid member provided between the insulating member and the end plate for allowing the coolant to flow parallel to a surface of the end plate.

2. The fuel cell stack according to claim 1, wherein a plurality of coolant channel grooves are formed on a surface of the insulating member facing the lid member or on a surface of the lid member facing the insulating member to form the coolant channel between the insulating member and the lid member.

3. The fuel cell stack according to claim 2, wherein the lid member has a terminal collar passing through the end plate; and
   the terminal collar has a terminal hole for inserting a terminal member protruding from the terminal plate in the stacking direction into the terminal hole.

4. The fuel cell stack according to claim 2, wherein the lid member has a coolant collar passing through the end plate; and
   the coolant collar has a coolant hole connected to the coolant passage.

5. The fuel cell stack according to claim 3, wherein the lid member has a coolant collar passing through the end plate; and
   the coolant collar has a coolant hole connected to the coolant passage.

6. The fuel cell stack according to claim 1, wherein the coolant flows through the coolant channel and the coolant flow field in the same direction.

* * * * *